US012329707B2

(12) United States Patent
Rhyder

(10) Patent No.: US 12,329,707 B2
(45) Date of Patent: Jun. 17, 2025

(54) MUSCLE MASSAGING ASSEMBLY

(71) Applicant: Michael Rhyder, Janesville, WI (US)

(72) Inventor: Michael Rhyder, Janesville, WI (US)

(*) Notice: Subject to any disclaimer, the term of this patent is extended or adjusted under 35 U.S.C. 154(b) by 812 days.

(21) Appl. No.: 17/570,543

(22) Filed: Jan. 7, 2022

(65) Prior Publication Data

US 2023/0218475 A1 Jul. 13, 2023

(51) Int. Cl.
*A61H 15/00* (2006.01)

(52) U.S. Cl.
CPC ... *A61H 15/0092* (2013.01); *A61H 2015/005* (2013.01); *A61H 2201/0207* (2013.01); *A61H 2201/0214* (2013.01); *A61H 2201/164* (2013.01)

(58) Field of Classification Search
CPC ........ A61H 7/003; A61H 15/00; A61H 15/02; A61H 15/0092; A61H 2015/0014; A61H 2015/0042; A61H 2015/005; A61H 2015/0064; A61H 2011/005; A61H 2201/0153
USPC .................................. 602/16, 18, 19, 21, 27
See application file for complete search history.

(56) References Cited

U.S. PATENT DOCUMENTS 4,008,715 A 2/1977 Brodbeck
4,727,865 A * 3/1988 Hill-Byrne .............. A61F 13/04 602/6
5,468,218 A * 11/1995 Ward ..................... A61H 11/00 601/144
9,107,795 B2 8/2015 Faussett
D796,053 S 8/2017 Phillips
2006/0155225 A1* 7/2006 Murdock ............... A61H 15/02 601/119
2010/0145243 A1 6/2010 Kantor
2010/0312158 A1* 12/2010 Lin ........................ A61H 7/004 601/134
2011/0071446 A1 3/2011 Citrin
2012/0065557 A1 3/2012 Phillips
2013/0227802 A1* 9/2013 Junkins .................... A47K 7/04 15/97.1
2013/0289454 A1* 10/2013 Wang ..................... A61H 15/00 601/132
2014/0276280 A1 9/2014 Oller, Jr.
2015/0111707 A1* 4/2015 Yan .................... A63B 21/4035 482/78
2016/0374893 A1* 12/2016 Johnston ............ A61H 15/0092 601/131
2018/0092797 A1* 4/2018 Uzzo ....................... A61F 13/08
(Continued)

FOREIGN PATENT DOCUMENTS

WO WO2009-022341 2/2009

*Primary Examiner* — Colin W Stuart
*Assistant Examiner* — Douglas Y Sul

(57) ABSTRACT

A muscle massaging assembly includes a leg ring which comprises a first half hingedly coupled to a second half such that the leg ring forms a closed loop to surround a user's leg. A plurality of balls is each integrated into the leg ring to compress against the user's leg when the leg ring is positioned around the user's leg. A tensioning unit is movably integrated into the leg ring and the tensioning unit is in communication with the plurality of balls. Each of the plurality of balls is either urged away from the leg ring or toward the leg ring when the tensioning unit is either tightened or loosened. A pair of handles is each coupled to the leg ring and each of the handles can be gripped by the user for urging the leg ring upwardly and downwardly along the user's leg.

9 Claims, 6 Drawing Sheets

(56) References Cited

U.S. PATENT DOCUMENTS

| | | | | |
|---|---|---|---|---|
| 2021/0145689 | A1* | 5/2021 | Cheong .............. | A61H 15/0085 |
| 2022/0409477 | A1* | 12/2022 | Triggianese ........... | A61H 7/003 |

* cited by examiner

MUSCLE MASSAGING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to massaging devices and more particularly pertains to a new massaging device for massaging a user's leg. The device includes a leg ring that can be positioned around the user's leg and a plurality of balls that are disposed on the leg ring for massaging the user's leg. The device includes a tensioning unit that is integrated into the leg ring and which adjusts positioning of the balls for increasing or decreasing that intensity with which the balls massage the user's leg.

(2) Description of Related Art Including Information Disclosed Under 37 CFR 1.97 and 1.98

The prior art relates to massaging devices including a variety of roller massagers that includes a pin which is rolled along a user's body. In at least one instance of the roller massagers, a plurality of balls is disposed on the pin for enhancing massaging the user's body. The prior art discloses a plurality of massagers that includes at least one ball for massaging various parts of a user's body. The prior art discloses a variety of roller massagers that includes a shaft and a plurality of rollers disposed on the shaft for rolling along a user's body for massaging the user's body.

BRIEF SUMMARY OF THE INVENTION

An embodiment of the disclosure meets the needs presented above by generally comprising a leg ring which comprises a first half hingedly coupled to a second half such that the leg ring forms a closed loop to surround a user's leg. A plurality of balls is each integrated into the leg ring to compress against the user's leg when the leg ring is positioned around the user's leg. A tensioning unit is movably integrated into the leg ring and the tensioning unit is in communication with the plurality of balls. Each of the plurality of balls is either urged away from the leg ring or toward the leg ring when the tensioning unit is either tightened or loosened. A pair of handles is each coupled to the leg ring and each of the handles can be gripped by the user for urging the leg ring upwardly and downwardly along the user's leg.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
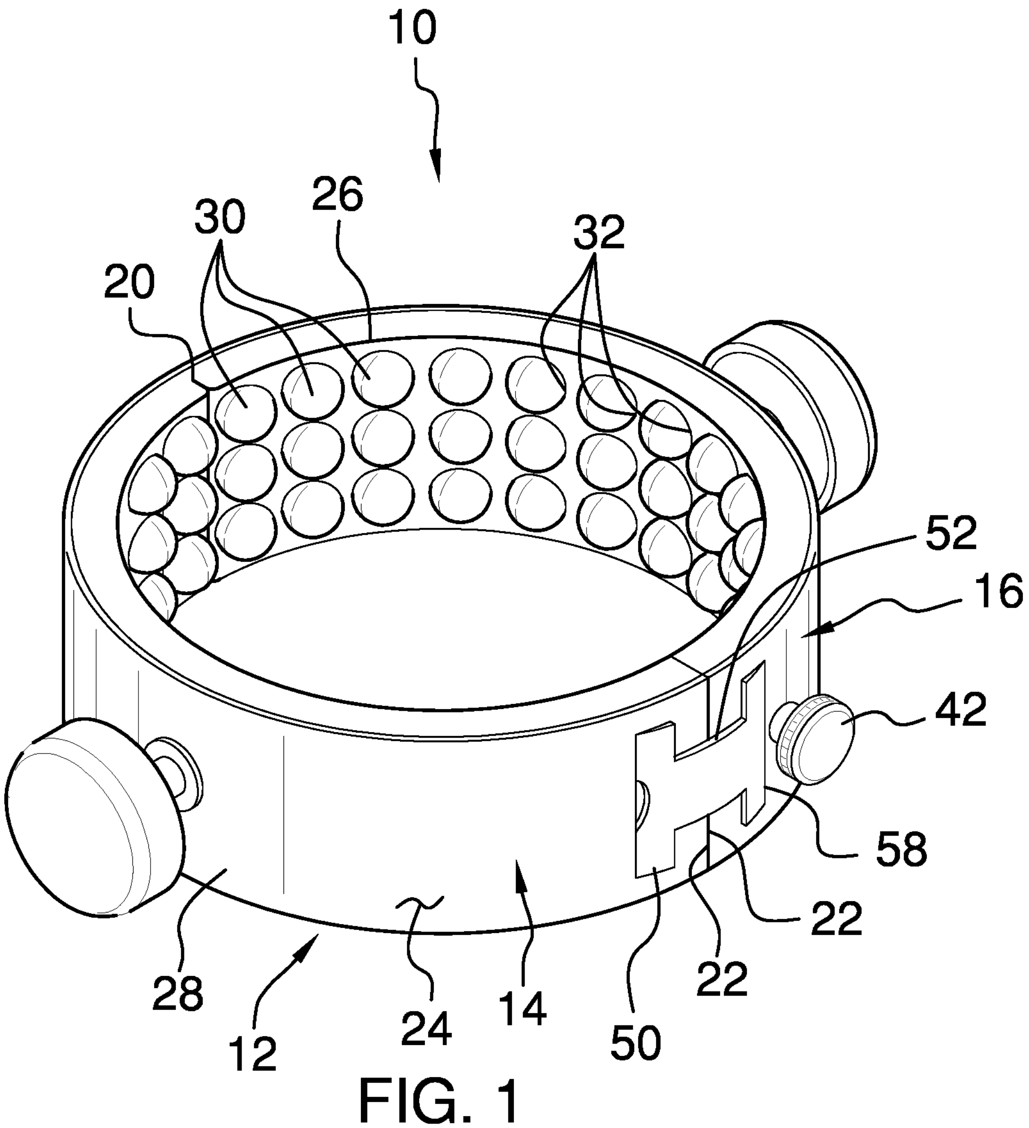
FIG. 1 is a perspective view of a muscle massaging assembly according to an embodiment of the disclosure.
Figure 2:
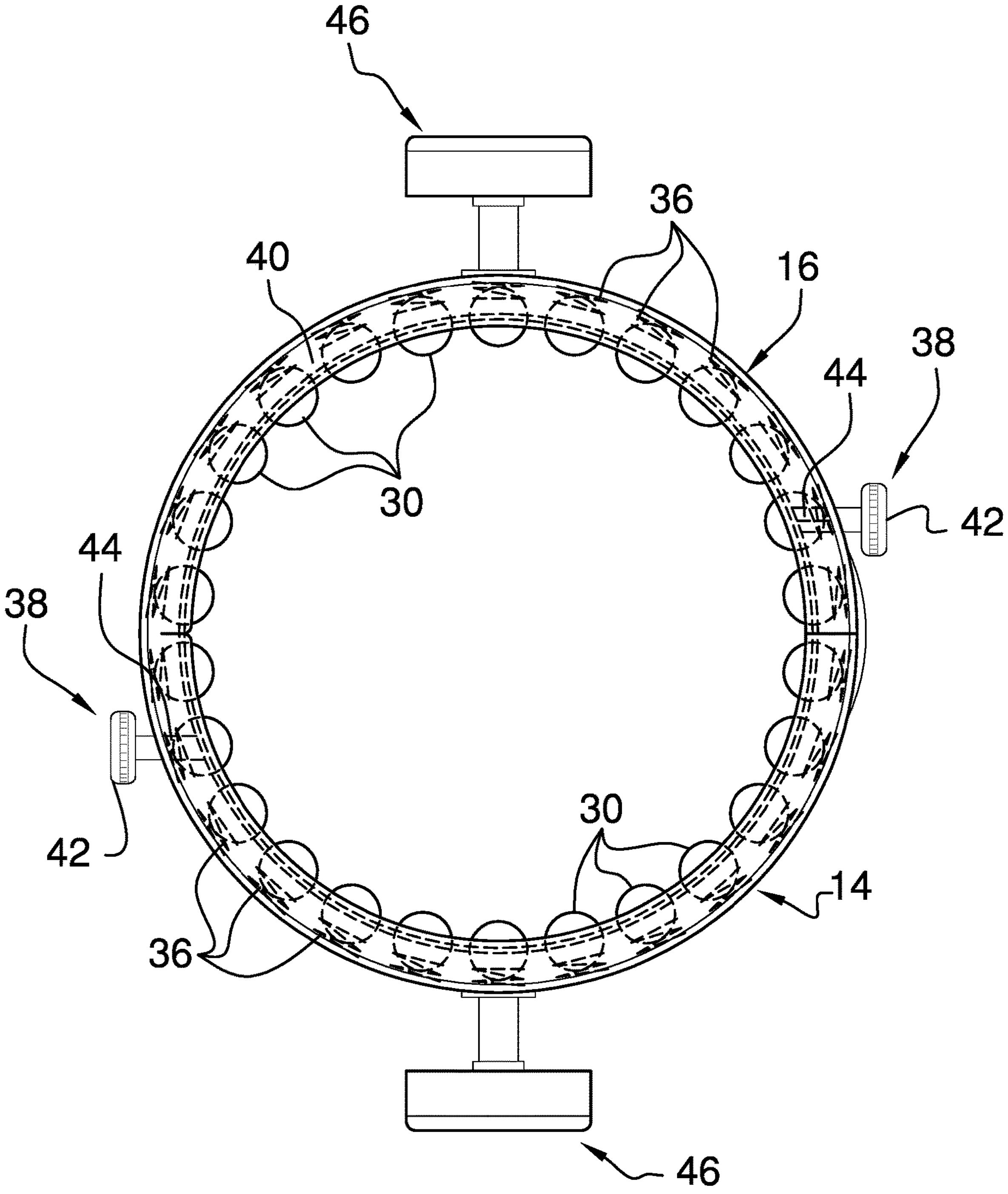
FIG. 2 is a top phantom view of an embodiment of the disclosure.
Figure 3:
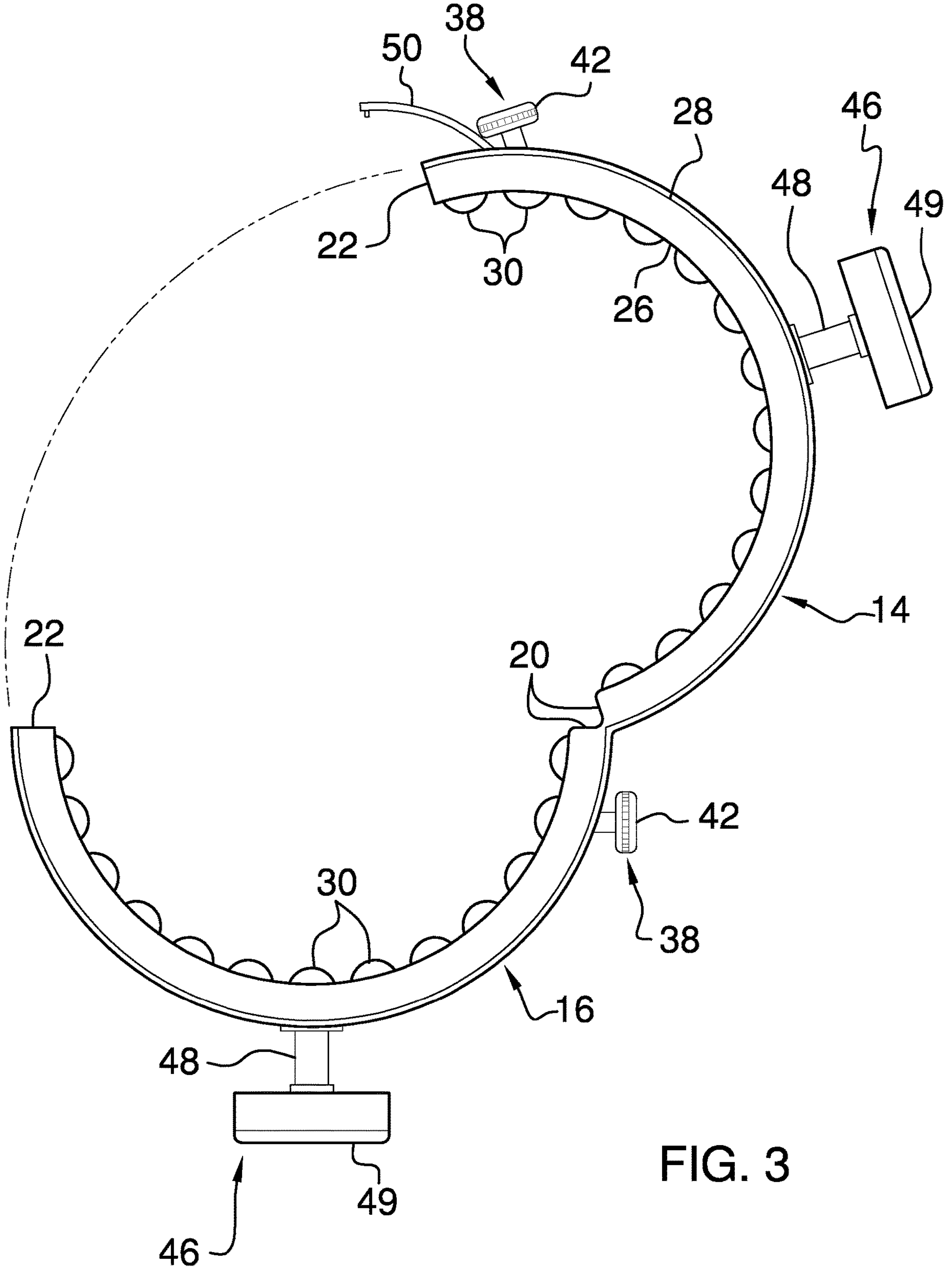
FIG. 3 is a bottom view of an embodiment of the disclosure showing a leg ring in an open position.
Figure 4:
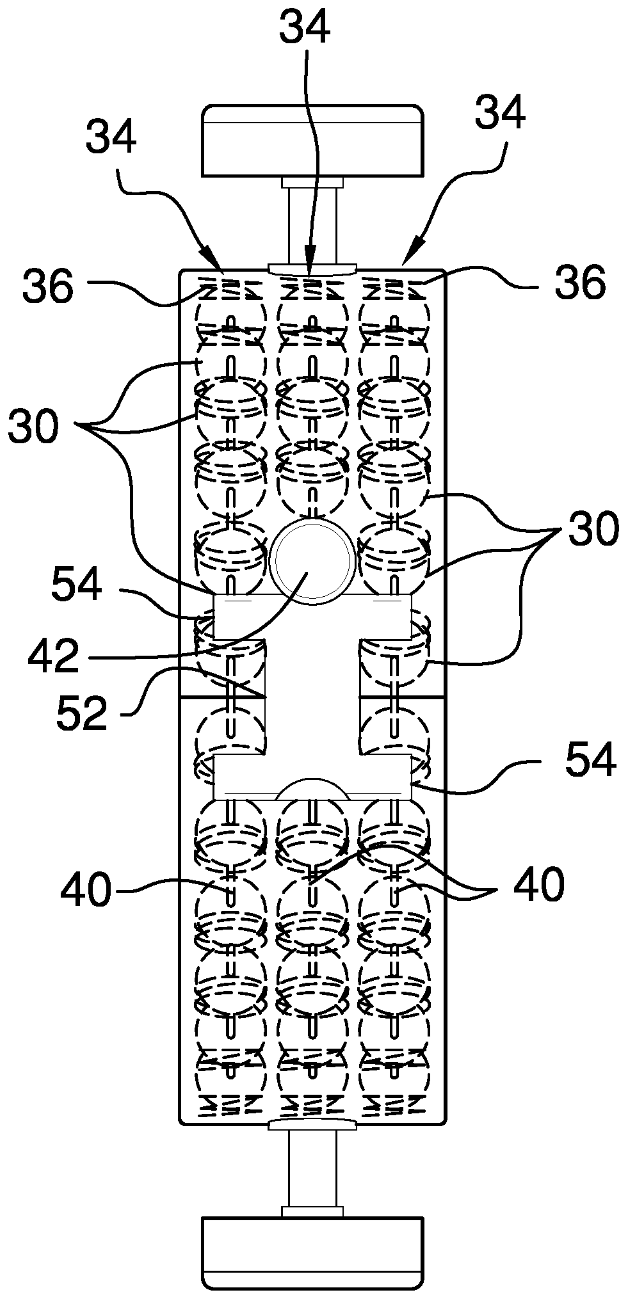
FIG. 4 is a front phantom view of an embodiment of the disclosure.
Figure 5:
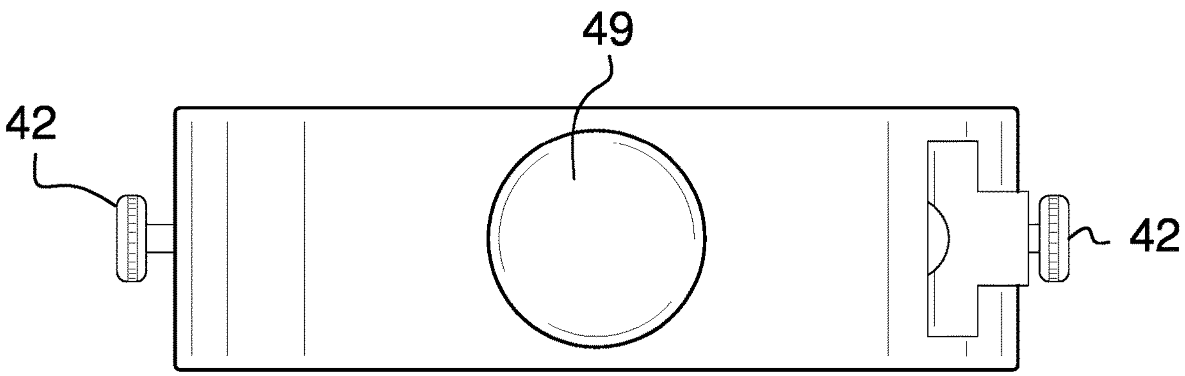
FIG. 5 is a back view of an embodiment of the disclosure.
Figure 6:
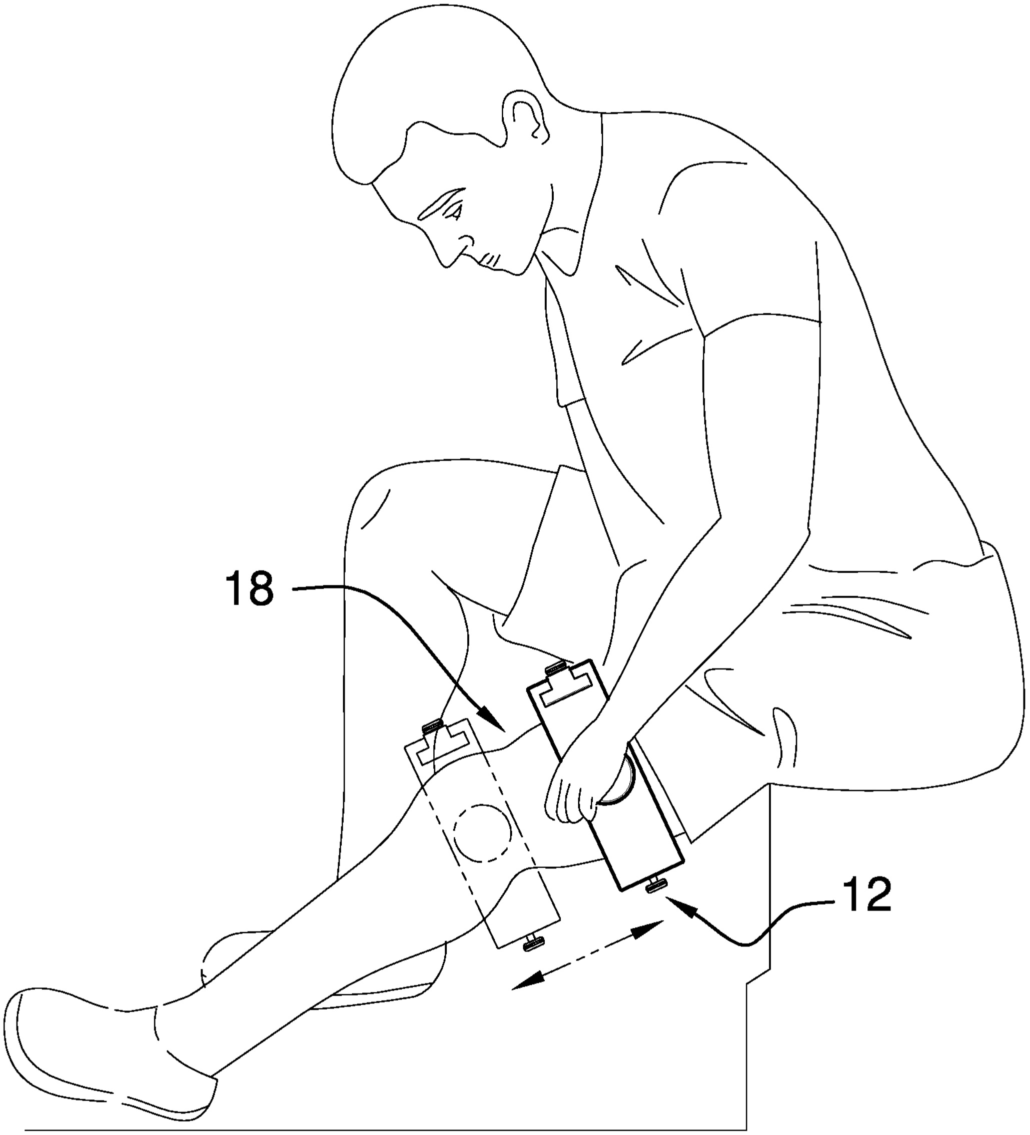
FIG. 6 is a perspective in-use view of an embodiment of the disclosure.

With reference now to the drawings, and in particular to FIGS. 1 through 6 thereof, a new massaging device embodying the principles and concepts of an embodiment of the disclosure and generally designated by the reference numeral 10 will be described.

As best illustrated in FIGS. 1 through 6, the muscle massaging assembly 10 generally comprises a leg ring 12 which comprises a first half 14 hingedly coupled to a second half 16 such that the leg ring 12 forms a closed loop. The leg ring 12 can be positioned in a closed position to facilitate the leg ring 12 to surround a user's leg 18. The leg ring 12 forms an open loop when the leg ring 12 is in an open position. In this way the leg ring 12 can be installed on or removed from the user's leg 18. The leg ring 12 may be manufactured in a variety of diameters, including small, medium and large, for accommodating a variety of sizes of user's legs.

Each of the first half 14 and the second half 16 has a first end 20, a second end 22 and an outer surface 24 extending between the first end 20 and the second end 22, and the outer surface 24 has an inward side 26 and an outward side 28. The outward side 28 comprises a resiliently flexible material which has structural integrity thereby facilitating the outward side 28 to be gripped by the user. The inward side 26 comprises a deformable material to cushion the user's leg 18 thereby enhancing comfort for the user, and the inward side 26 is foraminous. The resiliently flexible material associated with the outward side 28 may comprise a flexible plastic.

The first end 20 of the first half 14 is hingedly coupled to the first end 20 of the second half 16. The second end 22 of the first half 14 abuts the second end 22 of the second half 16 when the leg ring 12 is in the closed position. Conversely, the second end 22 of the first half 14 is spaced from the second end 22 of the second half 16 when the leg ring 12 is in the open position. A plurality of balls 30 is provided and each of the balls 30 is integrated into the leg ring 12 to compress against the user's leg 18 when the leg ring 12 is positioned around the user's leg 18. Each of the balls 30 is comprised of thermally dense material such that the plurality of balls 30 can either be heated or cooled to facilitate heat therapy or cold therapy on the user's leg 18.

Each of the balls 30 is partially recessed into a respective one of a plurality of holes 32 in the inward side 26 of the outer surface 24 of a respective one of the first half 14 and the second half 16 of the leg ring 12. Additionally, the plurality of balls 30 is arranged into a plurality of rows 34 of the balls 30. A plurality of biasing members 36 is provided and each of the biasing members 36 is positioned between a respective one of the balls 30 and the outward side 28 of the outer surface 24 of a respective one of the first half 14 and the second half 16 of the leg ring 12. Additionally, each of the biasing members 36 biases the respective ball 30 outwardly from the respective first half 14 and the second half 16.

A pair of tensioning units 38 is each movably integrated into the leg ring 12 and each of the tensioning units 38 is in communication with respective ones of the plurality of balls 30. Each of the plurality of balls 30 is urged away from the leg ring 12 when the tensioning units 38 are tightened. In this way the tensioning units 38 increases pressure against the user's leg 18 from the plurality of balls 30. Each of the plurality of balls 30 is urged toward the leg ring 12 when the tensioning units 38 are loosened. In this way the tensioning unit 38 decreases pressure against the user's leg 18 from the plurality of balls 30.

Each of the tensioning units 38 comprises a plurality of bands 40 that is each integrated into the leg ring 12. Each of the bands 40 extends through respective ones of each of the plurality of balls 30 in a respective one of the rows 34 of the balls 30. Additionally, each of the bands 40 is comprised of a deformable material. Each of the tensioning units 38 includes a tension knob 42 that is rotatably disposed on the outward side 28 of the outer surface 24 of a respective first half 14 and second half 16 of the leg ring 12. The tension knob 42 is rotatable in a first direction or a second direction.

Each of the tensioning units 38 includes a linkage 44 that is coupled between the tension knob 42 and each of the bands 40 such that the tension knob 42 is in mechanical communication with each of the bands 40. Each of the bands 40 is tightened when the tension knob 42 is rotated in the first direction such that each of the balls 30 is urged outwardly from the inward side 26 of the outer surface 24 of the first half 14 and the second half 16 of the leg ring 12. Each of the bands 40 is loosened when the tension knob 42 is rotated in the second direction such that each of the balls 30 is urged inwardly on the inward side 26 of the outer surface 24 of the first half 14 and the second half 16 of the leg ring 12.

A pair of handles 46 is each coupled to the leg ring 12 to be gripped by the user for urging the leg ring 12 upwardly and downwardly along the user's leg 18 thereby massaging the user's leg 18. Each of the handles 46 is positioned on opposing sides of the leg ring 12 with respect to each other. Additionally, each of the handles 46 comprises a stem 48 extending outwardly from the outward side 28 of the outer surface 24 of a respective one of the first half 14 and the second half 16 of the leg ring 12. Each of the handles 46 comprises a knob 49 that is disposed on the stem 48 for gripping.

A clasp 50 is provided and the clasp 50 is hingedly integrated into the first half 14 of the leg ring 12. The clasp 50 engages the second half 16 of the leg ring 12 when the leg ring 12 is in the closed position for retaining the leg ring 12 in the closed position. The clasp 50 comprises a central member 52 extending between a pair of end members 54. Each of the end members 54 is perpendicularly oriented with the central member 52, and the pair of end members 54 includes a free end member 56 and a coupled end member 58. The coupled end member 58 pivotally engages the outward side 28 of the outer surface 24 of the first half 14. The free end member 56 engages the outward side 28 of the outer surface 24 of the second half 16 when the leg ring 12 is in the closed position for retaining the leg ring 12 in the closed position. Conversely, the free end member 56 disengages the outward side 28 of the outer surface 24 of the second half 16 to facilitate the leg ring 12 to be positioned in the open position.

In use, the leg ring 12 is positioned around the user's leg 18 and the clasp 50 is manipulated to engage the second half 16 of the leg ring 12. In this way the leg ring 12 is closed around the user's leg 18. The tension knob 42 associated with each of the tension units 38 is rotated in either the first direction or the second direction, depending on the user's preference, for either increasing or decreasing the pressure of the balls 30 against the user's leg 18. Each of the handles 46 is gripped and the leg ring 12 is urged upwardly and downwardly along the user's leg 18. In this way the user can massage all of the muscles of the user's thigh or the user's lower leg. Additionally, the balls 30 can either be heated or cooled, in a microwave oven or freezer, for example, for heat therapy or cold therapy in conjunction with massaging the user's leg 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A muscle massaging assembly for massaging the major muscles in a user's legs, said assembly comprising:

a leg ring comprising a first half being hingedly coupled to a second half such that said leg ring forms a closed loop when said leg ring is in a closed position wherein said leg ring is configured to surround a user's leg, said leg ring forming an open loop when said leg ring is in an open position wherein said leg ring is configured to be installed on or removed from the user's leg;

a plurality of balls, each of said balls being integrated into said leg ring wherein each of said balls is configured to compress against the user's leg when said leg ring is positioned around the user's leg, each of said balls being comprised of thermally dense material such that said plurality of balls can either be heated or cooled wherein said plurality of balls is configured to facilitate heat therapy or cold therapy on the user's leg;

a pair of tensioning units, each of said tensioning units being movably integrated into a respective one of said first half and said second half of said leg ring, each of said tensioning units being in communication with respective ones of said plurality of balls, each of said plurality of balls being urged away from said leg ring when said tensioning units are tightened wherein said tensioning units are configured to increase pressure against the user's leg from said plurality of balls, each of said plurality of balls being urged toward said leg ring when said tensioning units are loosened wherein said tensioning units are configured to decrease pressure against the user's leg from said plurality of balls;

a pair of handles, each of said handles being coupled to said leg ring wherein each of said handles is configured to be gripped by the user for urging said leg ring upwardly and downwardly along the user's leg thereby massaging the user's leg, each of said handles being positioned on opposing sides of said leg ring with respect to each other; and a clasp being hingedly integrated into said first half of said leg ring, said clasp engaging said second half of said leg ring when said leg ring is in said closed position for retaining said leg ring in said closed position;

wherein each of said first half and said second half has a first end, a second end and an outer surface extending between said first end and said second end, said outer surface having an inward side and an outward side;

wherein said outward side comprises a resiliently flexible material having structural integrity wherein said outward side is configured to be gripped by the user;

wherein said inward side comprises a deformable material wherein said inward side is configured to cushion the user's leg thereby enhancing comfort for the user;

wherein said inward side is foraminous;

wherein said first end of said first half is hingedly coupled to said first end of said second half, said second end of said first half abutting said second end of said second half when said leg ring is in said closed position, said second end of said first half being spaced from said second end of said second half when said leg ring is in said open position;

each of said balls is partially recessed into a respective one of a plurality of holes in said inner side of said outer wall of a respective one of said first half and said second half of said leg ring, said plurality of balls being arranged into a plurality of rows of said balls; and said tensioning unit comprises a plurality of bands, each of said bands being integrated into said leg ring, each of said bands extending through respective ones of said plurality of balls in a respective one of said rows of said balls, each of said bands being comprised of a deformable material.

2. The assembly according to claim 1, further comprising a plurality of biasing members, each of said biasing members being positioned between a respective one of said balls and said outward side of said outer surface of a respective one of said first half and said second half of said leg ring, each of said biasing members biasing said respective ball outwardly from said respective first half and said second half.

3. The assembly according to claim 1, wherein said tensioning unit includes:

a tension knob being rotatably disposed on said outward side of said outer surface of a respective one of said first half or said second half of said leg ring, said tension knob being rotatable in a first direction or a second direction; and a linkage being coupled between said tension knob and each of said bands such that said tension knob is in mechanical communication with each of said bands, each of said bands being tightened when said tension knob is rotated in said first direction such that each of said balls is urged outwardly from said inward side of said outer surface of said first half and said second half of said leg ring, each of said bands being loosened when said tension knob is rotated in said second direction such that each of said balls is urged inwardly on said inward side of said outer surface of said first half and said second half of said leg ring.

4. The assembly according to claim 1, wherein each of said handles comprises a stem extending outwardly from said outward side of said outer surface of a respective one of said first half and said second half of said leg ring, each of said handles comprising a knob being disposed on said stem wherein said knob is configured to be gripped.

5. The assembly according to claim 1, wherein said clasp comprises a central member extending between a pair of end members, each of said end members being perpendicularly oriented with said central member, said pair of end members including a free end member and a coupled end member.

6. The assembly according to claim 5, wherein said coupled end member pivotally engages said outward side of said outer surface of said first half.

7. The assembly according to claim 5, wherein said free end member engages said outward side of said outer surface of said second half when said leg ring is in said closed position for retaining said leg ring in said closed position.

8. The assembly according to claim 5, wherein said free end member disengages said outward side of said outer surface of said second half to facilitate said leg ring to be positioned in said open position.

9. A muscle massaging assembly for massaging the major muscles in a user's legs, said assembly comprising:

a leg ring comprising a first half being hingedly coupled to a second half such that said leg ring forms a closed loop when said leg ring is in a closed position wherein said leg ring is configured to surround a user's leg, said leg ring forming an open loop when said leg ring is in an open position wherein said leg ring is configured to be installed on or removed from the user's leg, each of said first half and said second half having a first end, a second end and an outer surface extending between said first end and said second end, said outer surface having an inward side and an outward side, said outward side comprising a resiliently flexible material having structural integrity wherein said outward side is configured to be gripped by the user, said inward side comprising a deformable material wherein said inward side is configured to cushion the user's leg thereby enhancing comfort for the user, said inward side being foraminous, said first end of said first half being hingedly coupled to said first end of said second half, said second end of said first half abutting said second end of said second half when said leg ring is in said closed position, said second end of said first half being spaced from said second end of said second half when said leg ring is in said open position;

a plurality of balls, each of said balls being integrated into said leg ring wherein each of said balls is configured to compress against the user's leg when said leg ring is positioned around the user's leg, each of said balls being comprised of thermally dense material such that said plurality of balls can either be heated or cooled wherein said plurality of balls is configured to facilitate heat therapy or cold therapy on the user's leg, each of said balls being partially recessed into a respective one of a plurality of holes in said inner side of said outer wall of a respective one of said first half and said second half of said leg ring, said plurality of balls being arranged into a plurality of rows of said balls;

a plurality of biasing members, each of said biasing members being positioned between a respective one of said balls and said outward side of said outer surface of a respective one of said first half and said second half of said leg ring, each of said biasing members biasing said respective ball outwardly from said respective first half and said second half;

a pair of tensioning units, each of said tensioning units being movably integrated into a respective one of said first half and said second half of said leg ring, each of said tensioning units being in communication with respective ones of said plurality of balls, each of said plurality of balls being urged away from said leg ring when said tensioning units are tightened wherein said tensioning units are configured to increase pressure against the user's leg from said plurality of balls, each of said plurality of balls being urged toward said leg ring when said tensioning units are loosened wherein said tensioning units are configured to decrease pressure against the user's leg from said plurality of balls, each of said tensioning units comprising:

a plurality of bands, each of said bands being integrated into said leg ring, each of said bands extending through respective ones of said plurality of balls in a respective one of said rows of said balls, each of said bands being comprised of a deformable material;

a tension knob being rotatably disposed on said outward side of said outer surface of a respective one of said first half or said second half of said leg ring, said tension knob being rotatable in a first direction or a second direction; and a linkage being coupled between said tension knob and each of said bands such that said tension knob is in mechanical communication with each of said bands, each of said bands being tightened when said tension knob is rotated in said first direction such that each of said balls is urged outwardly from said inward side of said outer surface of said first half and said second half of said leg ring, each of said bands being loosened when said tension knob is rotated in said second direction such that each of said balls is urged inwardly on said inward side of said outer surface of said first half and said second half of said leg ring;

a pair of handles, each of said handles being coupled to said leg ring wherein each of said handles is configured to be gripped by the user for urging said leg ring upwardly and downwardly along the user's leg thereby massaging the user's leg, each of said handles being positioned on opposing sides of said leg ring with respect to each other, each of said handles comprising a stem extending outwardly from said outward side of said outer surface of a respective one of said first half and said second half of said leg ring, each of said handles comprising a knob being disposed on said stem wherein said knob is configured to be gripped; and a clasp being hingedly integrated into said first half of said leg ring, said clasp engaging said second half of said leg ring when said leg ring is in said closed position for retaining said leg ring in said closed position, said clasp comprising a central member extending between a pair of end members, each of said end members being perpendicularly oriented with said central member, said pair of end members including a free end member and a coupled end member, said coupled end member pivotally engaging said outward side of said outer surface of said first half, said free end member engaging said outward side of said outer surface of said second half when said leg ring is in said closed position for retaining said leg ring in said closed position, said free end member disengaging said outward side of said outer surface of said second half to facilitate said leg ring to be positioned in said open position.

* * * * *